United States Patent
Liu et al.

(10) Patent No.: US 10,257,051 B2
(45) Date of Patent: Apr. 9, 2019

(54) METHOD AND DEVICE FOR MANAGING RESOURCES WITH AN EXTERNAL ACCOUNT

(71) Applicant: Alibaba Group Holding Limited, Grand Cayman (KY)

(72) Inventors: Boyang Liu, Hangzhou (CN); Jun Li, Hangzhou (CN)

(73) Assignee: ALIBABA GROUP HOLDING LIMITED, Grand Cayman (KY)

(*) Notice: Subject to any disclaimer, the term of this patent is extended or adjusted under 35 U.S.C. 154(b) by 241 days.

(21) Appl. No.: 15/226,336

(22) Filed: Aug. 2, 2016

(65) Prior Publication Data

US 2017/0048114 A1 Feb. 16, 2017

(30) Foreign Application Priority Data

Aug. 10, 2015 (CN) .......................... 2015 1 0487834

(51) Int. Cl.
*H04L 12/24* (2006.01)
*H04L 29/08* (2006.01)
*H04L 29/06* (2006.01)

(52) U.S. Cl.
CPC ............ *H04L 41/28* (2013.01); *H04L 63/083* (2013.01); *H04L 63/0815* (2013.01);
(Continued)

(58) Field of Classification Search
CPC ....... H04L 41/28; H04L 67/10; H04L 63/102; H04L 63/0876
See application file for complete search history.

(56) References Cited

U.S. PATENT DOCUMENTS 7,886,038 B2   2/2011   Ferris
8,613,108 B1   12/2013  Aggarwal
(Continued)

FOREIGN PATENT DOCUMENTS

WO   2012091678 A1   7/2012

OTHER PUBLICATIONS

AWS Identity and Access Management (IAM) in the Cloud, available at http://web.archive.org/web/20150806101257/https://aws.amazon.com/iam/; Aug. 6, 2015 (6 pages).
(Continued)

*Primary Examiner* — Brandon S Hoffman
*Assistant Examiner* — Nega Woldemariam
(74) *Attorney, Agent, or Firm* — James J. DeCarlo; Greenberg Traurig, LLP

(57) ABSTRACT

Method and device for managing cloud computing resources with an external account, the resources being associated with one or more internal main accounts. The method includes verifying an identity of the external account via a server, determining, if the identity of the external account is verified, whether a virtual sub-account is bound to the external account, the virtual sub-account being subordinate to an internal main account of the one or more internal main accounts, and allowing, if it is determined that the virtual sub-account is bound to the external account, the external account to manage the resources associated with the internal main account based on pre-configured rights of the virtual sub-account.

17 Claims, 8 Drawing Sheets

(52) U.S. Cl.
CPC ........ *H04L 63/0876* (2013.01); *H04L 63/102* (2013.01); *H04L 67/10* (2013.01); *H04L 41/0896* (2013.01); *H04L 63/1441* (2013.01)

(56) References Cited

U.S. PATENT DOCUMENTS

| | | | |
|---|---|---|---|
| 8,621,553 | B2 | 12/2013 | Syed et al. |
| 8,862,720 | B2 | 10/2014 | DeHaan et al. |
| 8,875,166 | B2 | 10/2014 | Plewnia |
| 9,083,692 | B2 | 7/2015 | Ansari et al. |
| 9,210,173 | B2 | 12/2015 | Ferris |
| 9,251,545 | B2 | 2/2016 | Nastacio |
| 9,262,792 | B2 | 2/2016 | Nastacio |
| 2008/0091613 | A1 | 4/2008 | Gates et al. |
| 2011/0072499 | A1* | 3/2011 | Lin .................. G06F 21/35 726/6 |
| 2012/0117626 | A1* | 5/2012 | Yates .................. H04L 9/3213 726/4 |
| 2012/0246740 | A1 | 9/2012 | Brooker et al. |
| 2013/0005488 | A1 | 1/2013 | Evans et al. |
| 2013/0227286 | A1 | 8/2013 | Brisson |
| 2014/0289791 | A1 | 9/2014 | Acharya et al. |
| 2014/0379596 | A1 | 12/2014 | Pruss et al. |
| 2015/0013014 | A1 | 1/2015 | Daniel et al. |
| 2015/0067893 | A1 | 3/2015 | Lee |
| 2015/0288695 | A1 | 10/2015 | Ansari et al. |

OTHER PUBLICATIONS

International Search Report and Written Opinion to corresponding International Application No. PCT/US2016/045434 dated Oct. 20, 2016 (11 pages).

* cited by examiner

METHOD AND DEVICE FOR MANAGING RESOURCES WITH AN EXTERNAL ACCOUNT

CROSS-REFERENCE TO RELATED APPLICATIONS

This application claims the benefit of priority from Chinese Patent Application No. 201510487834.4 filed on Aug. 10, 2015, entitled "Method and Apparatus for Operating Resources Based on External Accounts," which is incorporated herein by reference in its entirety.

BACKGROUND

Field of the Disclosure

The present disclosure generally relates to improving resource management with an external account in cloud computing environments.

Description of the Related Art

In cloud computing scenarios, a user who applies for an internal main account in the cloud computing platform and purchases a series of cloud resources from the platform based on an internal main account will then need to manage these cloud resources. In practice, the user may authorize someone who not only has time, but also has relevant technical knowledge in managing the various cloud resources of the internal main account, as the user may not have time or relevant technical knowledge to do so. Also, different cloud resources may need to be managed by different resource management staffs.

Many users prefer to manage the cloud resources of the internal main account without giving the account name and the password to the resource management staff, so as to guarantee the safety of the internal main account. A master-slave account system has been used in the prior art. This allows a sub-account with a user name and a password under the framework of the internal main account to be created in the same platform for the resource managing staff.

BRIEF SUMMARY

However, the master-slave account system in the prior art lacks flexibility as the operation rights are limited to one platform, and further limited to a sub-account of one internal main account. Especially for certain types of outsourced applications, for example, if resource management staff takes over several cloud resource management businesses from multiple users, they will need to remember the account names and the passwords of multiple sub-accounts. While logging in, it can become an excessive burden on the staff to recall the account names and the passwords of the sub-accounts corresponding to the internal main accounts. The account names and the passwords cannot be managed in a unified manner. This creates a burden requiring additional staff time and resources and risks the use of simple or repeated passwords thus sacrificing security.

In light of the above problems, the present disclosure provides methods and devices for operating resources with an external account that can overcome the above and other problems in the present art.

According to some embodiments of the present disclosure, a method for managing resources with an external account includes conducting an identity verification of an external account via a server and querying a virtual sub-account bound to the external account if the identity of the external account has been verified, wherein each virtual sub-account is subordinate to an internal main account of the current platform. The method further includes allowing the external account to manage the resources of the internal main account based on pre-configured rights of the virtual sub-account when the virtual sub-account bound to the external account has been verified.

According to some embodiments of the present disclosure, a device for managing resources with an external account includes (1) identity verification circuitry for conducting an identity verification of an external account via a server; (2) virtual sub-account querying circuitry for querying a virtual sub-account bound to the external account if the identity of the external account has been verified, wherein each virtual sub-account is subordinate to an internal main account of the current platform; and (3) resource management circuitry for allowing the external account to manage the resources of the internal main account based on pre-configured rights of the virtual sub-account when the virtual sub-account bound to the external account has been verified.

Compared with the prior art, the embodiments of the present disclosure yield, among others, the following advantages: in the various embodiments of the disclosure, a virtual sub-account, which can be bound to an external account, but is not externally displayed, can be set up in any one internal main account of the current platform by the user. If the resource managing staff member or members of the external account wants to manage the cloud resources of the internal main account, they can conduct identity verification of an external account via the server and manage the resources of the internal main account based on the rights pre-configured on the virtual sub-account through the binding relationship between the external account and the virtual sub-account of the internal main account if the identity of the external account has been verified. Then, a resource managing staff member only needs to provide a habitually used external account of one server to a user of the internal main account to create a virtual sub-account binding to the external account before they can operate resources of various internal main accounts with one unified external account associated with multiple internal main accounts, thereby easing the burden on the resource managing staff and making the allocation of the managed resources more flexible.

BRIEF DESCRIPTION OF THE DRAWINGS

The foregoing and other objects, features, and advantages of the disclosure will be apparent from the following description of embodiments as illustrated in the accompanying drawings, in which reference characters refer to the same parts throughout the various views. The drawings are not necessarily to scale, emphasis instead being placed upon illustrating principles of the disclosure.

DETAILED DESCRIPTION

Figure 1:
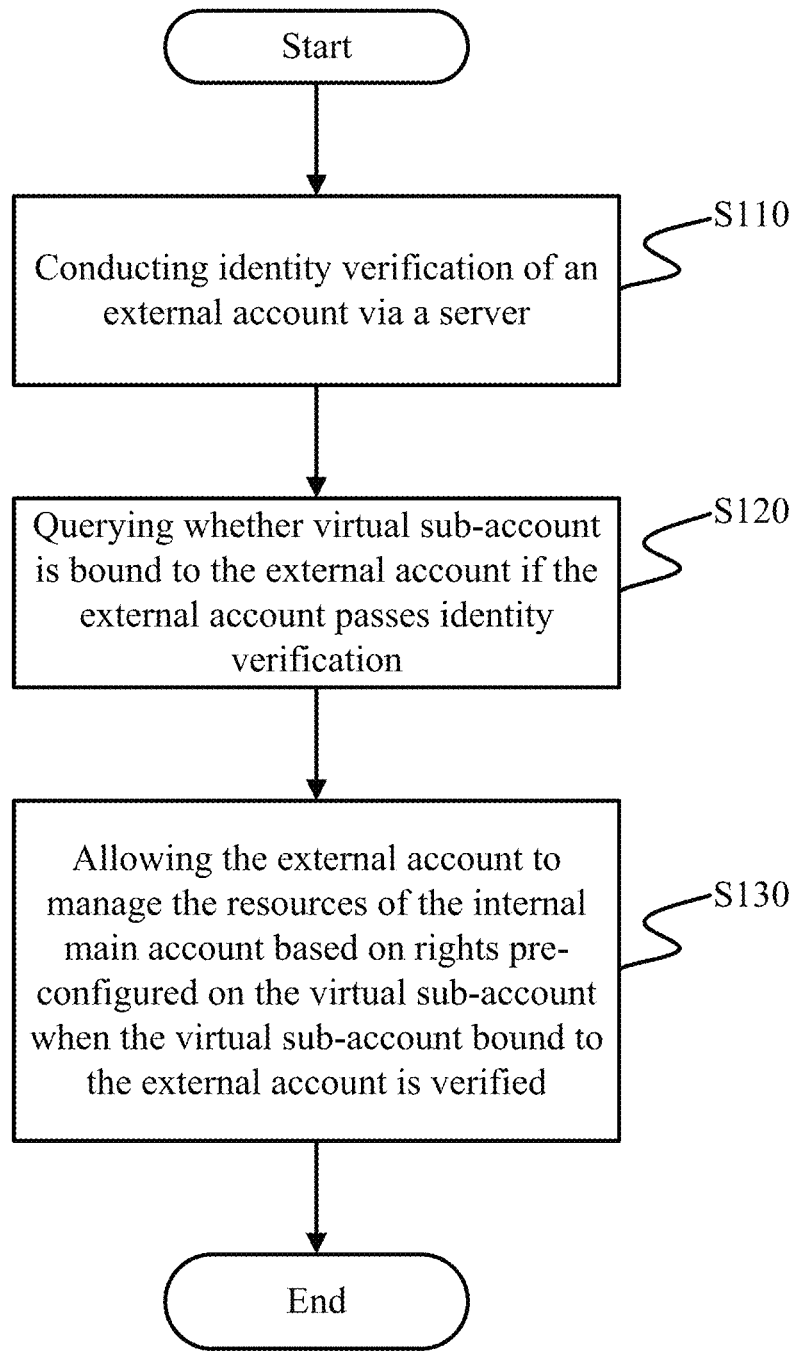
FIG. 1 presents a flow diagram illustrating a method for operating resources with an external account according to some embodiments of the present disclosure.

The present disclosure will now be described more fully hereinafter with reference to the accompanying drawings, which form a part hereof, and which show, by way of illustration, certain example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware, or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

These computer program instructions can be provided to a platform or processor of: a general purpose computer to alter its function to a special purpose; a special purpose computer; ASIC; or other programmable digital data processing apparatus, such that the instructions, which execute via the processor of the computer or other programmable data processing apparatus, implement the functions/acts specified in the block diagrams or operational block or blocks, thereby transforming their functionality in accordance with embodiments herein.

For the purposes of this disclosure the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

For the purposes of this disclosure a "network" should be understood to refer to a network that may couple devices so that communications may be exchanged, such as between a server and a client device or other types of devices, including between wireless devices coupled via a wireless network, for example. A network may also include mass storage, such as network attached storage (NAS), a storage area network (SAN), or other forms of computer or machine readable media, for example. A network may include the Internet, one or more local area networks (LANs), one or more wide area networks (WANs), wire-line type connections, wireless type connections, cellular or any combination thereof. Likewise, sub-networks, which may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs.

The principles described herein may be embodied in many different forms. In the present disclosure, if the resource managing staff needs to manage the resources of multiple internal main accounts, they can provide a habitually used external account on a server to the users of these internal main accounts for binding the external account to their own virtual sub-accounts. Then, the server of the external account provides an identity verification to the external account when the resource managing staff is logging in the current platform. If the external account has been verified, the resource managing staff can operate the resources of the internal main account through the virtual sub-account with the internal main account based on the rights pre-allocated thereto. Therefore, if a resource managing staff can manage the resources of the multiple internal accounts of the current platform with one commonly used external account, the administrative burden on them will be eased. Moreover, applying the teachings herein, the configuration and operation of resources can be made more flexible and more broadly applicable.

FIG. 1 presents a flow diagram illustrating a method for operating resources with an external account according to some embodiments of the present disclosure.

In step 110, the method conducts an identity verification of an external account via the server.

According to some embodiments, the present disclosure relates to the structures of the client side, the current platform and the server of the external account. Certainly, the server of the external account can be of various types as disclosed herein, as servers can be configured in numerous application specific ways. Taking the Ali cloud platform, by way of non-limiting example, an account in the Ali cloud platform, such as alice@aliyun.com, is the internal main account. The server of the external account is different than the current platform, such as the servers: Sina website, Netease, Tencent, etc. For example, bob@sina.com is an external account of the Sina server. The external account server can provide an identity verification process to the external account based on its existing account system. External account server may include, or be communicatively coupled to, a verification server that provides one or more identity verification processes as described more fully herein.

Then, if the owner of the external account, such as the aforementioned staff, wants to manage the resources in the internal account from the current platform, such as the Ali cloud platform, identity verification of the external account is conducted based on the client side and the current platform, firstly, and then through the server of the external account. If the identity of the external account has been verified, the process continues to Step S120.

If the identity of the external account fails to be verified, it means the login of the external account fails and the process ends. In embodiments, the reasons for login failure can be displayed on the client side if the identity of the external account fails to be verified, such as incorrect signature of the server of the external account, etc.

As an example, suppose the owner of bob@sina.com wants to manage the resources of alice@aliyun.com. The owner can visit the login page of the Ali cloud platform from the client side and send a request for identity verification to the Sina server from the login page.

The Sina server will provide an account input page to the client side in response to the identity verification request. The owner can then enter the account name bob@sina.com and the password 123456 on the account input page displayed, and click OK.

The Sina server will conduct an internal verification of the account name bob@sina.com and the password 123456 to authenticate whether the account name bob@sina.com exists and whether the password is correct. If both the account name and the password pass verifications, it will return an identity verification result to the Ali cloud platform.

Upon parsing by the Ali cloud platform, if the returned result shows the verification of bob@sina.com succeeds, then the process proceeds to Step S120.

Figures 2, 3:
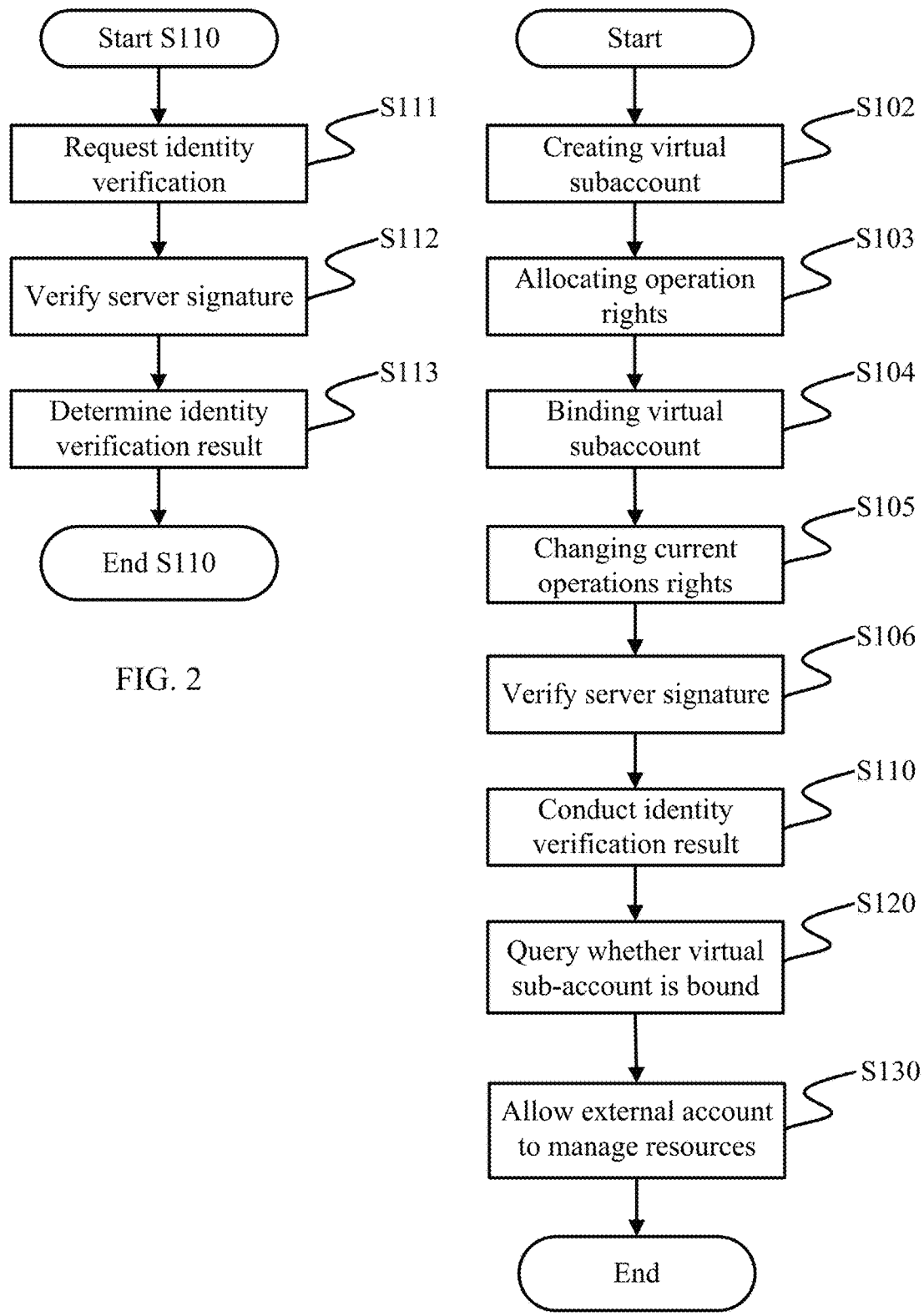
FIG. 2 presents a flow diagram illustrating a method for conducting identity verification of an external account via a server according to some embodiments of the present disclosure.
FIG. 3 presents a flow diagram illustrating a method for operating resources with an external account according to some embodiments of the present disclosure.

According to some embodiments of the present disclosure, Step S110 may comprise the following sub-steps (FIG. 2).

In step S111, the method requests identity verification of an external account via the server.

Take alice@aliyun.com, the internal main account of the Ali cloud platform, and bob@sina.com, the external account of the Sina server, for example.

If the owner of the external account bob@sina.com opens the login page of the Ali cloud platform from the client side and wants to manage the resources of alice@aliyun.com, he sends a request for identity verification to the Sina server from the login page of the Ali cloud platform.

The Sina server will provide an account input page to the client side of the owner after receiving the identity verification request. The owner can enter the account name bob@sina.com and the password 123456 on the account input page displayed.

When the account name bob@sina.com and its password 123456 are authenticated as valid by the Sina server, an identity verification result specific to bob@sina.com will be generated. The identity verification result comprises the external account bob@sina.com and the signature of the server of the external account. In the present example, the signature is that of the Sina server. Then, the Sina server will return the identity verification result to the Ali cloud platform.

It will be recognized from the disclosure herein that the identity verification result can comprise other content as well; the present application imposes no restrictions thereon.

The client can be a browser or other client side application or device specific app; the present disclosure imposes no restrictions with respect to the client side implementation, as the teachings herein can be applied to multiple client side platform types.

In step S112, the method verifies the server signature of the identity verification results returned by the external account server. If the server signature has been verified, the process continues to step S113.

After receiving the above identity verification, the Ali cloud platform will authenticate the server signature of the identity verification result. If the external account has been verified, it means bob@sina.com is an authentic external account accepted by Sina and Step S113 can be begin. If the verification of server signature fails, it means bob@sina.com might be a counterfeit external account with security risks, and then the login of the external account bob@sina.com will be rejected.

It is understood that in embodiments of the present disclosure, the verification processes for the server signature under different identity verification protocols are different.

For example, for the SAML protocol, the public key of a wide variety of external account types can be pre-obtained with regard to the current platform. After receiving the above identity verification result, the public key of the corresponding external account server can be extracted directly for authenticating the server signature of the identity verification result.

For the OpenID protocol, the verification process of the server signature is similar to that of SAML protocol.

For the OAuth protocol, the server signature can be extracted from the above identity verification result and sent to the corresponding external account server to inform the server to conduct signature verification and return a security token to the current platform. After the current platform receives the security token, the verification of the server signature is regarded as valid.

In step S113, the method determines that the external account of the identity verification result is valid.

With regard to the identification verification result verified by the server of the external account, the embodiment of the present example can determine that the external account is valid. For example, for the bob@sina.com, the Ali Cloud platform in the embodiment of the present example can determine that bob@sina.com can enter the subsequent processes.

According to some embodiments of the present disclosure, Step S110 comprises conducting an identity verification of an external account via the server through an identity verification protocol, including the OAuth protocol, the OpenID protocol, or the SAML protocol.

In the embodiment of the present example, an identity verification protocol is configured between the client side, the current platform and the server of the external account, so that the client side can conduct identity verification for the external account through the server via the current platform.

In the embodiment of the present example, the identity verification protocol can be one or more of the OAuth protocol, the SAML protocol, or the OpenID protocol. For example, the OAuth protocol is used between the client side, the Ali cloud platform and the server of Sina. The OpenID protocol is used between the client, the Ali cloud platform and the server of Netease. The SAML protocol is used between the client side, the Ali cloud platform and the server of Netease. These various protocols can be utilized as applicable to the underlying platform to which the management functions and structures described herein are being applied.

It is understandable that other identity verification protocols can be utilized in addition to the above-mentioned protocols in practical application. The present disclosure imposes no restrictions on the particular verification protocol applied.

In embodiments, the OAuth (Open Authorization) protocol provides a safe, open and simple standard for authorization of the user's resources. The authorization of the OAuth protocol is secure and will not expose the information of the account (such as account name and password) to a third party. The third party can obtain the authorization of the user's resources without using the account name and the password of the user.

In the some embodiments of the present disclosure, the client of the owner is taken as the Client of the OAuth protocol, the Ali cloud platform as the access side of the OAuth protocol and the server of the external account as the AS (Authorization Server) of the OAuth protocol. The client side sends an authorization request to the current platform. The current platform redirects to the server of the external account. The client side enters the user name and the password of the external account on the server for verification, and it redirects to the current platform for subsequent operation if the external account has been verified.

The SAML (Security Assertion Markup Language) protocol is a standard based on XML and used for exchanging verification and authorization data between different security domains.

In some embodiments of the present disclosure, the client side of the owner is the Subject of the SAML protocol. The current platform is the Relying Party and the server of the external account is the Asserting Party. The client side can send a request to the current platform for access authorization. Then, the current platform redirects the request to the server of the external account. The server conducts identity verification for the external account and redirects it to the current platform for subsequent process if the external account has been verified.

The OpenID protocol is a user-centered digital identity recognition framework, characterized by openness and divergence.

In some embodiments of the present disclosure, the client side is the Subject of the User-staff of the OpenID protocol. The server of the external account is the OP (Identity provider or OpenID provider, being the provider of OpenID) and the current platform is the Relying Party. The external account is required to register a unique ID in the OP system of the server of the external account in advance, and then it redirects to the server after the owner clicking on the login interface of the OP. The owner can enter the user name and the password of the external account for verification; and the server can return the verification result to the current platform.

According to some embodiments of the present disclosure, prior to step 110 additional steps may be executed as depicted in more detail in FIG. 3.

In step S102, the method creates a virtual sub-account in the internal main account having a user name and a password. The virtual sub-account does not have a password for operating resources with an external account.

In some embodiments of the present disclosure, the user of the internal main account of the current platform can pre-create a virtual sub-account, e.g. "virtual_user". The virtual_user has no login password and does not need to be displayed externally. Take the internal account alice@aliyun.com, for example, the user of alice@aliyun.com with the password of 111111 can create a virtual sub-account virtual_user within the alice@aliyun.com space.

In step S103, the method allocates the operation rights to the virtual sub-account for operating the resources of the internal main account.

In some embodiments, one internal main account may have different resources distributed in different folders and some of them cannot be exposed to the external resource managing staff. Then, the operation rights can be set for the resources in these folders. For example, set a scope of the folder that can be operated by the virtual sub-account and the operation types, etc., wherein the operation types can be Read-only, Write-only, and Read-Write.

In step S104, the method binds the virtual sub-account to an external account.

The created virtual sub-account can be bound to the external account of the resources managing staff selected by the user. For example, if the user selects bob@sina.com, that user can bind the virtual_user of alice@aliyun.com to bob@sina.com.

In some embodiments of the present disclosure, an external account may be bound with the virtual sub-accounts of multiple internal main accounts. For example, bob@sina.com can also bound with the virtual sub-account of to m@aliyun.com.

In some embodiments of the present disclosure, multiple virtual sub-accounts may be created in each internal main account and each virtual sub-account may by bound with a different external account.

According to some embodiments of the present disclosure, after step S104 the method may further include the following step.

In step S105, the method changes the current operation rights of the virtual sub-account in the internal main account.

In some embodiments of the present disclosure, for easy controlling of the internal resources and the resources managed by the external account, the user of the internal account may login in to the current platform with the internal main account and setup the resource management rights for the virtual sub-account bound to the external account that needs to be controlled within the internal main account space.

It shall be noted that the resources of the internal account mentioned in the embodiments of the present application can be any digital data, such as statistical data, videos, documents, media files, or other types or forms of digital data.

According to some embodiments of the present disclosure, after Step S104, the process may further include the following step.

In step S106, the method changes the current external account bound to the virtual sub-account to another external account.

In some embodiments of the present disclosure, for an internal main account, if a resources managing staff member of the external account bound to a virtual sub-account asks for leave, or the user wants to hire another staff member to take the place of the former member for managing the resources, the user may desire to bind a different external account to the virtual sub-account. The user may login in the current platform with the user name and the password of the internal main account and change the external account bound to the above virtual sub-account to another external account.

Returning to FIG. 1, we complete the discussion of steps S120 and S130, which also completes the discussion of these steps in FIG. 3, which are the same as the corresponding steps in FIG. 1, and are numbered accordingly.

In step S120, the method queries whether the virtual sub-account is bound to the external account if the identity of the external account has been verified. Each virtual sub-account is subordinate to an internal main account of the current platform.

In some embodiments of the present disclosure, the current platform records the one-to-one relationship between the internal main account and the virtual sub-account and external account. For the authenticated external account, it will inquire whether the above relationship corresponding to the external account exists. If there are multiple relationships, it can be determined by resource managing staff. For example, if bob@sina.com is respectively bound with the virtual sub-accounts of both alice@aliyun.com and to m@aliyun.com, then the resource managing staff will be prompted to determine the desired internal main account.

If there is only one relationship, it can be determined by the resource managing staff directly, or the virtual sub-account bound to the external account can be determined directly, and no prompting is required.

In step S130, the method allows the external account to operate the resources of the internal main account based on pre-configured rights of the virtual sub-account when the virtual sub-account bound to the external account has been verified.

When one virtual sub-account bound to the external account has been verified by the resources managing staff, the current platform allows the resources managing staff to operate the resources of the above internal main account based on the rights pre-configured on the above virtual sub-account when the internal main account bound to the external account has been verified In some embodiments of the present disclosure, the above virtual sub-account is only an internally maintained rights identity and is not displayed externally. Therefore, the client will not provide an input interface for the virtual sub-account. The virtual sub-account does not need the password of the external account, because it does not have a password either. Moreover, as in the embodiment of the present example, the input interface of the virtual sub-account will not be provided to the client and thus login cannot be conducted with a virtual sub-account alone, if logging in and managing the resources of the internal main account is required, the virtual sub-account shall be bound to the external account, thus the resources of the internal main account can be operated by logging in with the external account.

In some embodiments of the disclosure, a virtual sub-account, which can be bound to an external account but not externally displayed, can be set up in any one internal main account of the current platform by the user. If the resource managing staff of the external account wants to manage the cloud resources of the above internal main account, they can conduct identity verification of an external account via the server and manage the resources of the internal main account based on the rights pre-configured on the virtual sub-account through the binding relationship between the external account and the virtual sub-account of the internal main account if the identity of the external account has been verified. Then, a resource managing staff member or members only needs to provide a habitually used external account of one server to a user of the internal main account to create a virtual sub-account binding to the external account before they can manage resources of various internal main accounts with one unified external account associated with multiple internal main accounts, thereby easing the administrative burden on the resource managing staff and making the allocation of the managed resources more flexible. It also avoids the need to remember multiple complex passwords for the resources to be managed, thus improving security by avoiding the selection or use of easy to remember passwords or the need to record the passwords in some manner thus increasing the risk of misappropriation. Thus the embodiments herein improve network security and flexibility of resource administration in cloud based systems.

Figure 4:
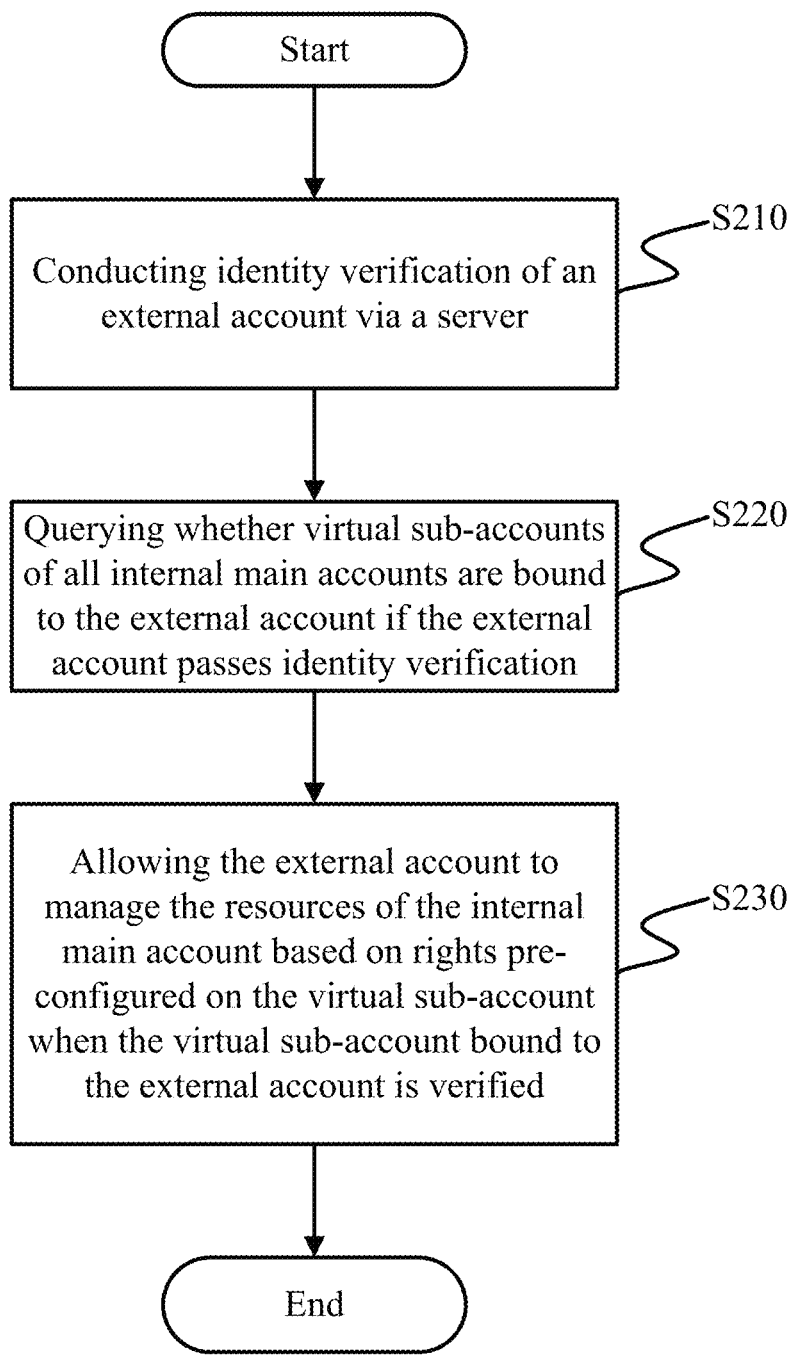
FIG. 4 presents a flow diagram illustrating method for operating resources with an external account according to some embodiments of the present disclosure.

FIG. 4 presents a flow diagram illustrating method for operating resources with an external account according to some embodiments of the present disclosure.

In step S210, the method conducts an identity verification of an external account via the server.

In step S220, the method inquires whether the virtual sub-accounts of all internal main accounts are bound to the external account if the identity of the external account has been verified. Each virtual sub-account is subordinate to an internal main account of the current platform.

For example, for the external account bob@sina.com, it needs to be determined whether all of the internal main accounts in the current platform have a virtual sub-account bound to bob@sina.com. If so, a prompt box can be popped up to display all user names of the internal main accounts, belonging to the virtual sub-account bound to bob@sina.com, for users to select. When the user selects an internal name, it means they have determined the virtual sub-account bound to bob@sina.com, and Step S230 can begin.

In step S230, the method allows the external account to manage the resources of the internal main account based on pre-configured rights of the virtual sub-account when the virtual sub-account bound to the external account has been verified.

In some embodiments of the present disclosure, without pre-determining which internal main account is selected for managing the resources, the resource managing staff can directly send an identity verification request to the server of the external account. The server will return an identity verification result. After the result has been verified as valid, the current platform will look for the relationships between the internal main account and the virtual sub-account and external account corresponding to the external account and display each internal main account in a box on the client side for the resource managing staff to select. Selecting one of the internal main accounts means a virtual sub-account bound to the external account has been verified by the user. If none of the above relationships is determined, the user will be notified that no internal main account is bound to the external account. In the embodiments of the present example, it can directly jump to the server of the external account through the current platform for identity verification without pre-entering the user name of the internal main account by the user. Then, the current platform can directly provide the virtual sub-accounts bound to the external account to the user for selection, which has facilitated the operation of the user with the external account.

Figure 5:
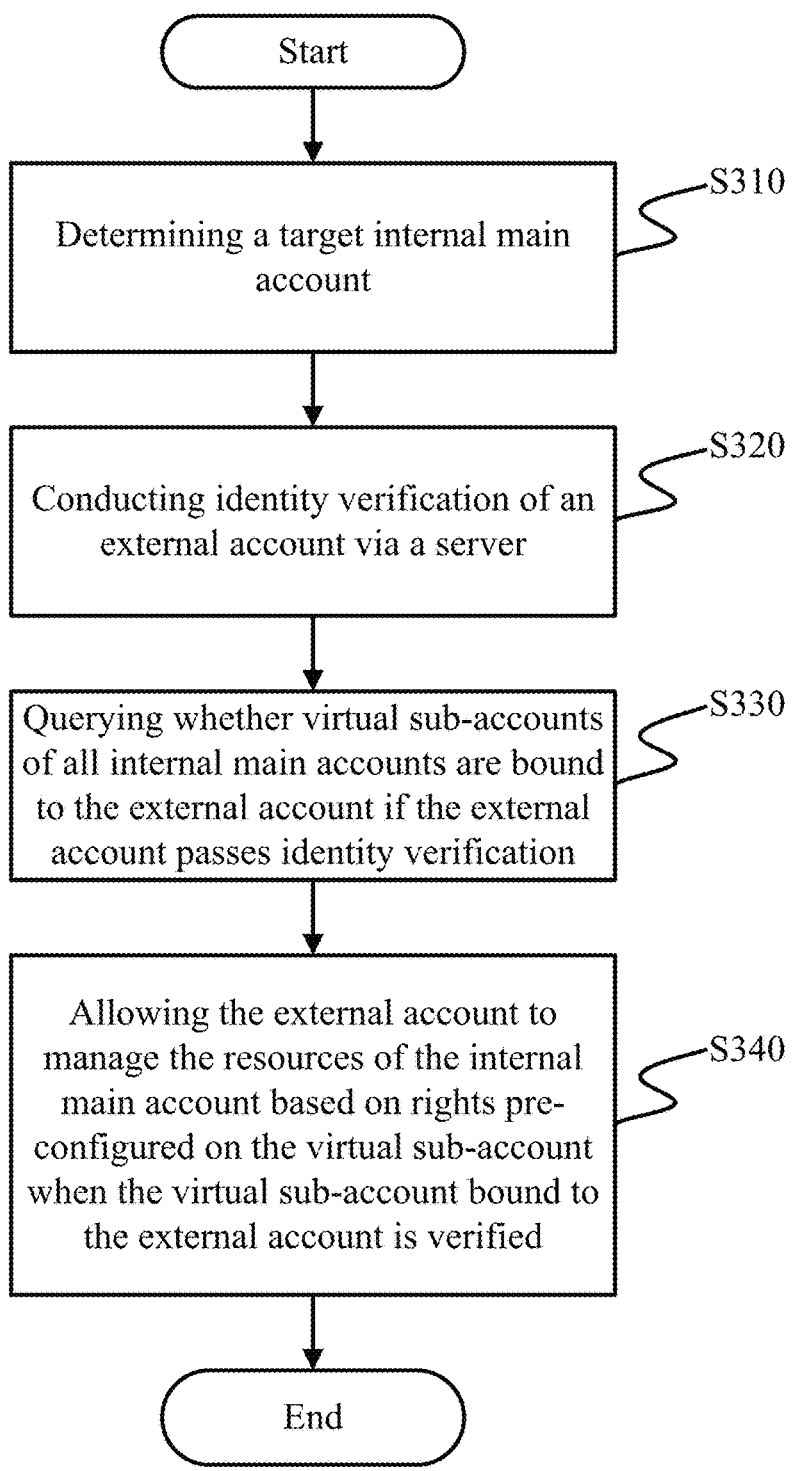
FIG. 5 presents a flow diagram of a method for operating resources with an external account according to some embodiments of the present disclosure.

FIG. 5 presents a flow diagram of a method for operating resources with an external account according to some embodiments of the present disclosure.

In step S310, the method determines the target internal main account.

The user can enter the name of the target internal main account in the login page of the current platform in advance.

For example, they can enter alice@aliyun.com on the login page and click on the identity verification interface to jump to Step 320.

In step S320, the method conducts an identity verification of an external account via the server.

In step S330, the method inquires whether the virtual sub-accounts of all internal main accounts are bound to the external account if the identity of the external account has been verified. Each virtual sub-account is subordinate to an internal main account of the current platform.

As a non-limiting example, if the identity verification of the external account bob@sina.com is verified, the embodiment of the present example can directly inquire whether the virtual sub-account of alice@aliyun.com is bound to bob@sina.com. If alice@aliyun.com has a virtual sub-account bound to bob@sina.com, then it shall confirm the virtual sub-account is bound to the external account and proceed to Step S340.

In step S340, the method allows the external account to manage the resources of the internal main account based on pre-configured rights of the virtual sub-account when the virtual sub-account bound to the external account has been verified.

In some embodiments of the present disclosure, the resource managing staff can determine which internal main account is selected for operating the resources in advance, for example, determining alice@aliyun.com directly, and then sending an identity verification request to the server of the external account. After the identity verification result returned by the server has been verified as valid, the current platform will look for the relationships between the internal main account and the virtual sub-account and external account corresponding to alice@aliyun.com and determine if the virtual sub-account is bound to the external account, if the relationship can be identified. If none of the above relationships are found, the user will be notified that no internal main account is bound to the external account. In the embodiment of the present example, the target internal main account can be determined in advance; therefore, purposeful inquiry can be carried out as to whether the external account is bound to a virtual sub-account of the target internal account if the identity of the external account has been verified, which results in a more rapid processing speed of resource management functions and thus can save system resources.

For the purposes of this disclosure a module, unit, or circuitry is a software, hardware, or firmware (or combinations thereof) system, process or functionality, or component thereof, that performs or facilitates the processes, features, and/or functions described herein (with or without human interaction or augmentation). A module can include sub-modules; and a unit can comprise a sub-unit. Software components of a module/unit may be stored on a computer readable medium for execution by a processor. Modules/units may be integral to one or more servers or devices, or be loaded and executed by one or more servers/devices. One or more modules may be grouped into an engine or an application. Thus, devices according to embodiments of the present disclosure may be integrated as a single device or distributed, and may include software, hardware, or firmware, and combinations thereof.

Figure 6:
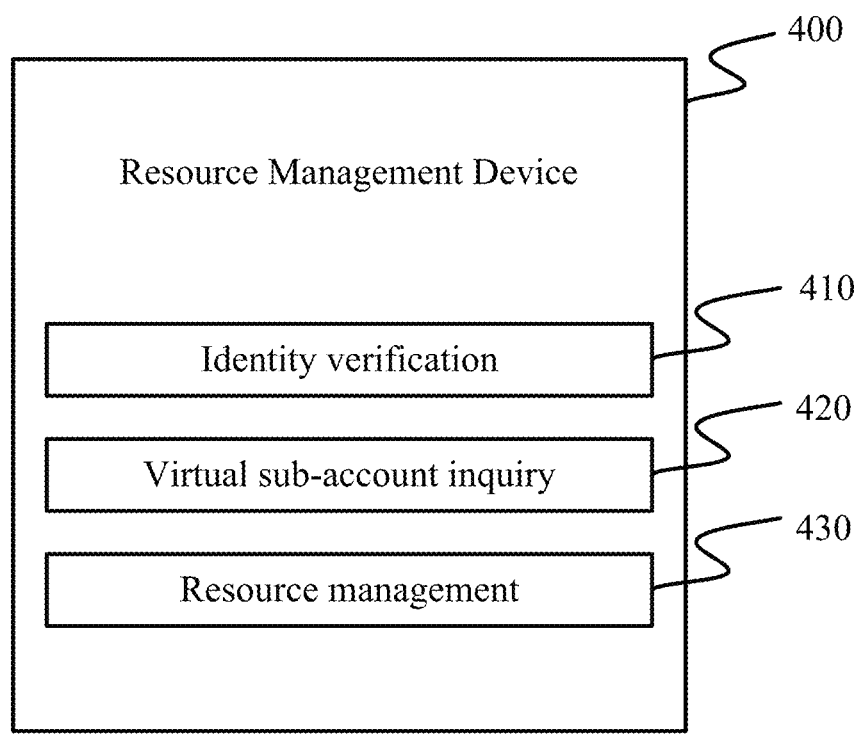
FIG. 6 presents a block diagram of a device for operating resources with an external account according to some embodiments of the present disclosure.

FIG. 6 presents a block diagram of a device for managing resources with an external account according to some embodiments of the present disclosure. The device 400 for managing resources with an external account includes the following modules.

Identity verification module 410 conducts identity verification of an external account via a server.

Virtual sub-account inquiry module 420 queries whether the virtual sub-account is bound to the external account, if the identity of the external account has been verified. Each virtual sub-account is subordinate to an internal main account of the current platform.

Resource management module 430 allows the external account to manage the resources of the internal main account based on pre-configured rights of the virtual sub-account when the virtual sub-account bound to the external account has been verified.

Figure 7:
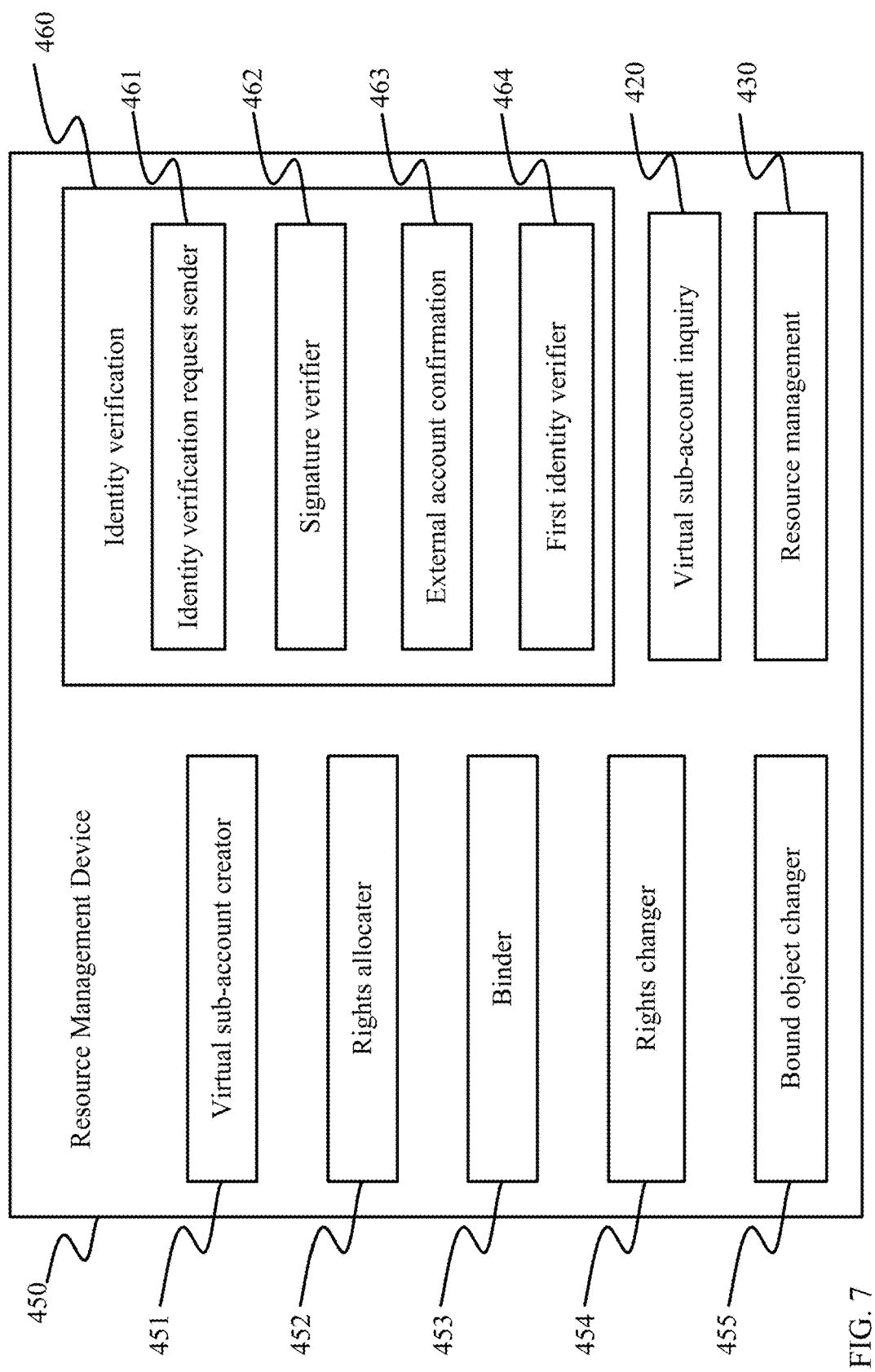
FIG. 7 presents a block diagram of a device for operating resources with an external account according to some embodiments of the present disclosure.

According to some embodiments of the present disclosure (FIG. 7), a resource management device 450 may include an identity verification module 460 which performs the same functions as the above identity verification module 410, and further includes the following.

Identity verification request module 461 requests an identity verification for an external account via the server.

Signature verification module 462 verifies the server signature of the identity verification results returned by the external account server.

External account confirmation module 463 determines that the external account of the identity verification results has been verified, if the server signature has been verified.

According to some embodiments of the present disclosure, the resource management device 450 may also include the following.

Virtual sub-account creating module 451 creates a virtual sub-account in the internal main account having a user name and a password. The virtual sub-account does not have a password for operating resources with an external account.

Rights allocating module 452 allocates management rights to the virtual sub-account for managing the resources of the internal main account.

Binding module 453 binds a virtual sub-account to an external account.

According to some embodiments of the present disclosure, the resource management device 450 may further include a rights changing module 454, which changes the current management rights of the virtual sub-account in the internal main account.

According to some embodiments of the present disclosure, the resource management device 450 may further include a bound object changing module 455 which changes the current external account bound to the virtual sub-account to another external account.

According to some embodiments of the present disclosure, the identity verification module 460 further includes a first identity verification module 464 which conducts an identity verification of an external account via the server through an identity verification protocol, for example, the OAuth protocol, the SAML protocol, or the OpenID protocol.

Figure 8:
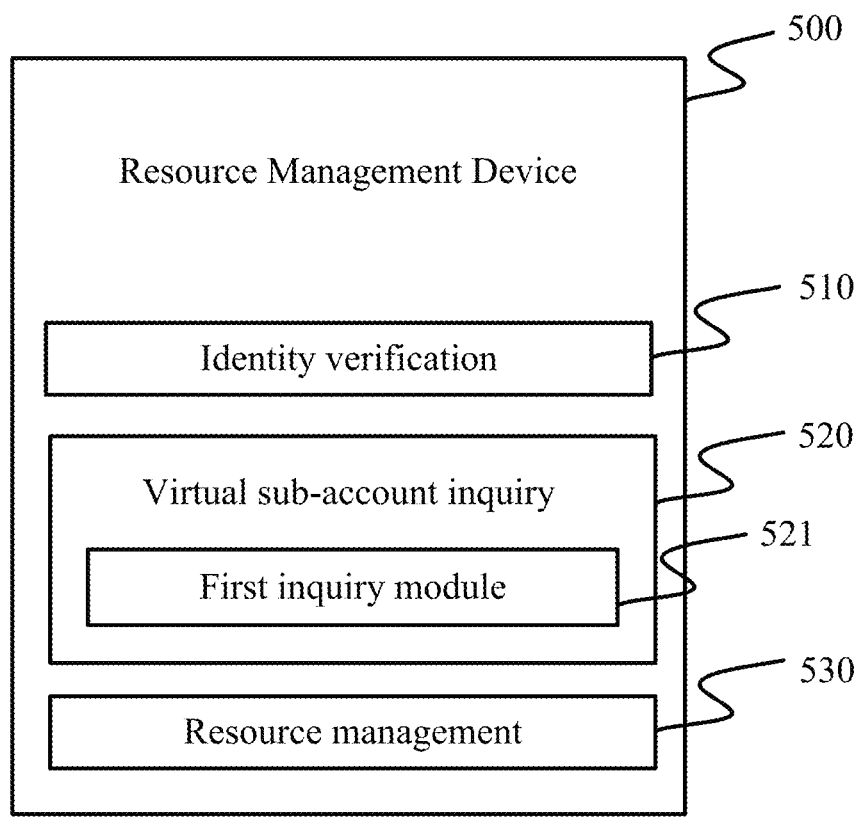
FIG. 8 presents a block diagram of a device for operating resources with an external account according to some embodiments of the present disclosure.

FIG. 8 presents a block diagram of a device for operating resources with an external account according to some embodiments of the present disclosure.

The resource management device 500 for managing resources with an external account includes the following components.

Identity verification module 510 conducts identity verification of an external account via a server. The identity module 510 may be configured, for example, as in the previous embodiments' identity verification modules 410 or 460.

Virtual sub-account inquiry circuitry 520 is configured to perform the functions of the virtual sub-account inquiry module 420 as described above, and additionally includes a first inquiry module 521 which queries whether the virtual sub-accounts of all internal main accounts are bound to the external account, if the identity of the external account has been verified. Each virtual sub-account is subordinate to an internal main account of the current platform.

Resource management module 530 allows the external account to operate the resources of the internal main account based on pre-configured rights of the virtual sub-account when the virtual sub-account bound to the external account has been verified.

Figure 9:
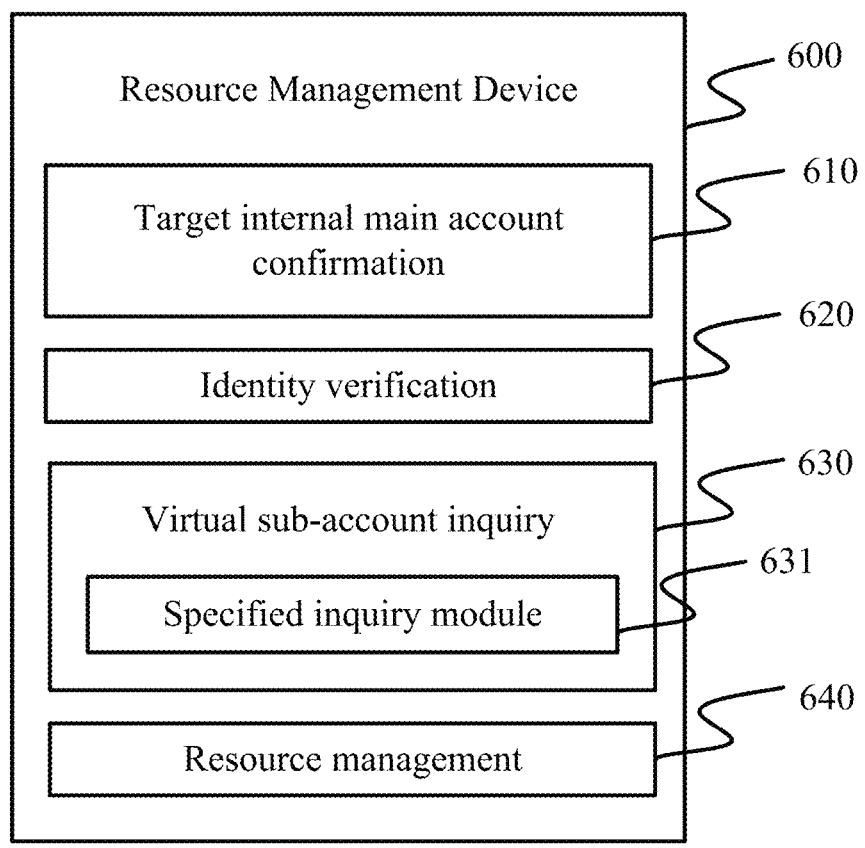
FIG. 9 presents a block diagram of a device for operating resources with an external account according to some embodiments of the present disclosure.

FIG. 9 is a schematic block diagram illustrating a non-limiting embodiment of a device for operating resources with an external account according to some embodiments of the present disclosure.

The resource management device 600 for managing resources with an external account includes the following components.

Target internal main account confirmation module 610 determines the target internal main account.

Identity verification module 620 conducts identity verification of an external account via a server.

Virtual sub-account inquiry module 630 performs the functions of the virtual sub-account inquiry circuitry 420 as described above, and additionally includes a specified inquiry module 631, for inquiring whether the virtual sub-accounts of all internal target accounts are bound to the external account. Each virtual sub-account is subordinate to an internal main account of the current platform.

Resource management module 640 allows the external account to operate the resources of the internal main account based on pre-configured rights of the virtual sub-account when the virtual sub-account bound to the external account has been verified.

Each embodiment in the Description, described in a progressive manner, describes alternative or similar or interchangeable embodiments, thus for similar and/or identical parts between embodiments, these can be understood by cross-referencing each other.

A person skilled in the art shall understand that the embodiments of the present application may be provided as a method, a device or a computer program product. Therefore, the embodiments of the present application can adopt the forms as full hardware embodiments, full software embodiments or combining combination of both software and hardware. Moreover, the embodiments of the present application can adopt the form of a computer program product applied in one or more available computer storage media (including, but not limited to, disk memories, CD-ROMs, optical memories, etc.) containing computer readable program codes.

In one typical configuration, the computer equipment forming the computers, devices and/or servers described herein comprise one or more central processing units (CPU), I/O interfaces, network interfaces and internal or externally accessible memories. The memories may comprise the volatile memory, the random access memory (RAM) and/or the nonvolatile RAM of the computer readable medium, such as read-only memory (ROM) or flash RAM. The internal memory is an example of the computer readable media. The computer readable media refers to physical or tangible storage (as opposed to signals), and may comprise permanent and non-permanent, portable or non-portable media and can store data with any method or technology. The data can be computer readable commands, data structures, program modules or other data. The storage media includes, but is not limit to, phase change memory (PRAM), static random access memory (SRAM), dynamic random access memory (DRAM), other types of random access memory (RAM), read-only memory (ROM), electrically erasable programmable read-only memory (EEPROM), flash memory or other memory technology, compact disc read-only memory (CD-ROM), digital versatile disc (DVD) or other optical storage, magnetic cassette tape, tape/disk memory or other magnetic storage device or other non-transmission medium for storing the signals that can be accessed by computer equipment. According to the definitions herein, unless specifically set forth, the computer readable media do not include transitory media, such as data signal and carrier wave.

The embodiments of the present application are described according to the method and the terminal equipment (system) of the embodiments of the present application and the process diagram and/or block diagram of the computer program product. It shall be understood that each process in the process diagram and/or block diagram and/or process and/or block of the flow diagram and/or block diagram can be combined and implemented by the computer program commands. These computer program commands can be provided to the CPU of a general-purpose computer for appropriate programming, a special-purpose computer, the embedded processor or other programmable data-processing terminal equipment for generating a machine, so that the commands executed by the CPU of the computer or other programmable data-processing terminal equipment can form a device for realizing the functions specified by one process or processes in the process diagram and/or one block or blocks in the block diagram. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

The computer program commands can also be stored in the computer readable memory that can guide the computer or the other programmable data-processing terminal equipment to operate in a particular way, so that the commands can form a product comprising a command device that can realize the functions specified by one process or processes in the process diagram and/or one block or blocks in the block diagram.

These computer program commands can also be loaded into the computer or other programmable data-processing terminal equipment for executing a series of operation steps to generate the realized process, so that the commands executed by the CPU of the computer or other programmable data-processing terminal equipment can provide the steps for realizing the function specified by one process or processes in the process diagram and/or one block or blocks in the block diagram.

Although the preferred embodiments of the present application are described herein, a person skilled in the art can alter or modify the embodiments once the basic concepts of inventiveness are made known. Therefore, the Claims herein are intended to be interpreted as comprising the preferred embodiments and all alterations and modifications that fall into the scope of the Embodiments of the present application.

Lastly, it shall be noted that the terms "first", "second" and the like therein are only provided to distinguish one physical part or one operation from another, and it does not necessarily require or imply that these physical parts or operations have such actual relationships or are in such order. Moreover, the terms "including", "comprising" or any other such variants are intended to express the meaning of non-exclusive comprising, so that the process, method, articles or terminal equipment may include a series of elements and are not limited by these elements, and may also include the elements that have not been explicitly listed, or the elements that are intrinsic to the process, the method, the articles or the terminal equipment. Without further specification, the element specified by the term "including a . . . " does not exclude that other elements also exist in the process, the method, the article or the terminal equipment that include the elements.

The method and the device for operating resources with an external account provided by the present application are illustrated with details as above. The specific cases are used for explaining the principles and embodiments of the present application therein; the descriptions of above embodiments are merely for facilitating the understanding of the method and the core ideas of the present application; meanwhile, for a person skilled in the art, the specific embodiments and the scope of the application both may change based on the ideas of the present application. In conclusion, the content of the Description shall not be interpreted as restrictions to the present application.

What is claimed is:

1. A method for managing cloud computing resources, the method comprising:
   requesting, using an identity verification protocol, an identity verification for an external account via a verification server, the identity verification comprising an identifier of the external account and a verification server signature;
   verifying the verification server signature returned by the verification server;
   determining that the identity of the external account is verified if the server signature is verified;
   if the identity of the external account is verified, determining whether a virtual sub-account is bound to the external account, the virtual sub-account having pre-configured rights to manage the cloud computing resources, the cloud computing resources being associated with one or more internal main accounts, the virtual sub-account being subordinate to one of the one or more internal main accounts the determining whether the virtual sub-account is bound to the external account comprising: querying whether any virtual sub-accounts subordinate to the one or more internal main accounts are bound to the external account, wherein each of the one or more internal main accounts has at least one subordinate virtual sub-account; and
   if it is determined that the virtual sub-account is bound to the external account, allowing the external account to manage the cloud computing resources associated with the internal main account based on the pre-configured rights of the virtual sub-account.

2. The method according to claim 1, further comprising: creating the virtual sub-account subordinate to the internal main account, the internal main account having a user name and a password, and the virtual sub-account not having a password for managing resources with the external account; allocating management rights to the virtual sub-account as pre-configured rights for managing the resources of the internal main account; and binding the virtual sub-account to the external account.

3. The method according to claim 2, further comprising: modifying the pre-configured rights of the virtual sub-account in the internal main account, wherein the modifying the pre-configured rights is after the allocating.

4. The method according to claim 2, further comprising: second binding the virtual sub-account to another external account after the step of binding.

5. The method according to claim 1, wherein in the verifying the identity of the external account, if the identity is not verified via the external account, a cause of login failure is displayed.

6. The method according to claim 1, wherein the identity verification protocol includes at least one of an OAuth protocol, a SAML protocol, and an OpenID protocol.

7. The method according to claim 1, wherein the determining whether the virtual sub-account is bound to the external account comprises: querying whether a virtual sub-account of a target account of the one or more internal main accounts is bound to the external account, wherein each of the one or more internal main accounts has at least one subordinate virtual sub-account.

8. A device for managing cloud computing resources, the device comprising:
   one or more processors;
   a network interface; and
   a memory storing computer-executable instructions executable by the one or more processors, the instructions causing the device to:
      request, using an identity verification protocol, an identity verification for an external account via a verification server, the identity verification comprising an identifier of the external account and a verification server signature;
      verify the verification server signature returned by the verification server;
      determine that the identity of the external account is verified if the server signature is verified;
      if the identity of the external account is verified, determine whether a virtual sub-account is bound to the external account, the virtual subaccount having pre-configured rights to manage the cloud computing resources, the cloud computing resources being associated with one or more internal main accounts, the virtual sub-account being subordinate to one of the one or more internal main accounts, the determining whether the virtual sub-account is bound to the external account comprising: querying whether any virtual sub-accounts subordinate to the one or more internal main accounts are bound to the external account, wherein each of the one or more internal main accounts has at least one subordinate virtual sub-account; and
      if it is determined that the virtual sub-account is bound to the external account, allow the external account to manage the cloud computing resources associated with the internal main account based on the pre-configured rights of the virtual sub-account.

9. The device according to claim 8, the instructions further causing the device to: create the virtual sub-account subordinate to the internal main account, the internal main account having a user name and a password, and the virtual sub-account not having a password for managing resources with the external account; allocate management rights to the virtual sub-account as pre-configured rights for managing the resources of the internal main account; and bind the virtual sub-account to the external account.

10. The device according to claim 9, the instructions further causing the device to: modify the pre-configured rights of the virtual sub-account in the internal main account, wherein the modifying the pre-configured rights is after the allocating.

11. The device according to claim 9, the instructions further causing the device to: second bind the virtual sub-account to another external account after the instruction to bind.

12. The device according to claim 8, wherein in the instruction to verify the identity of the external account, if the identity is not verified via the external account, a cause of login failure is displayed.

13. The device according to claim 8, wherein the identity verification protocol includes at least one of an OAuth protocol, a SAML protocol, and an OpenID protocol.

14. The device according to claim 8, wherein the instruction to determine further causes the device to: query whether a virtual sub-account of a target account of the one or more internal main accounts is bound to the external account, wherein each of the one or more internal main accounts has at least one subordinate virtual sub-account.

15. A non-transitory computer-readable storage medium storing computer-executable instructions that when executed by a processor, cause the processor to perform a method for managing cloud computing resources, the method comprising
requesting, using an identity verification protocol, an identity verification for an external account via a verification server, the identity verification comprising an identifier of the external account and a verification server signature;
verifying the verification server signature returned by the verification server;
determining that the identity of the external account is verified if the server signature is verified;
if the identity of the external account is verified, determining whether a virtual sub-account is bound to the external account, the virtual subaccount having pre-configured rights to manage the cloud computing resources, the cloud computing resources being associated with one or more internal main accounts, the virtual sub-account being subordinate to one of the one or more internal main accounts, the determining whether the virtual sub-account is bound to the external account comprising: querying whether any virtual sub-accounts subordinate to the one or more internal main accounts are bound to the external account, wherein each of the one or more internal main accounts has at least one subordinate virtual sub-account; and
if it is determined that the virtual sub-account is bound to the external account, allowing the external account to manage the cloud computing resources associated with the internal main account based on the pre-configured rights of the virtual sub-account.

16. The non-transitory computer-readable storage medium according to claim 15, the method further comprising: creating the virtual sub-account subordinate to the internal main account, the internal main account having a user name and a password, and the virtual sub-account not having a password for managing resources with the external account; allocating management rights to the virtual sub-account as pre-configured rights for managing the resources of the internal main account; and binding the virtual sub-account to the external account.

17. A method for managing cloud computing resources, the method comprising:
receiving an identity verification result of an external account returned by a verification server, the verification result comprising an identifier of the external account and a verification server signature;
verifying the verification server signature returned by the verification server;
determining whether a virtual sub-account is bound to the external account, the virtual sub-account having pre-configured rights to manage the cloud computing resources, the cloud computing resources being associated with one or more internal main accounts, the virtual sub-account being subordinate to one of the one or more internal main accounts, the determining whether the virtual sub-account is bound to the external account comprising: querying whether any virtual sub-accounts subordinate to the one or more internal main accounts are bound to the external account, wherein each of the one or more internal main accounts has at least one subordinate virtual sub-account; and
if it is determined that the virtual sub-account is bound to the external account, allowing the external account to manage the cloud computing resources associated with the internal main account based on the pre-configured rights of the virtual sub-account.

* * * * *